United States Patent [19]

Law

[11] 4,160,124
[45] Jul. 3, 1979

[54] MULTIPLE DIAL ADAPTER

[75] Inventor: Wendell A. Law, Kaysville, Utah

[73] Assignee: Sperry Rand Corporation, New York, N.Y.

[21] Appl. No.: 801,988

[22] Filed: May 31, 1977

[51] Int. Cl.² ............................................. H04M 11/00
[52] U.S. Cl. .................................. 179/2 DP; 364/900;
179/90 BD
[58] Field of Search ... 364/200 MS File, 900 MS File, 364/200, 900; 179/2 DP, 90 BD

[56] References Cited

U.S. PATENT DOCUMENTS

| | | | |
|---|---|---|---|
| 3,362,015 | 1/1968 | Mackie et al. | 340/172.5 |
| 3,560,936 | 2/1971 | Busch | 340/172.5 |
| 3,989,899 | 11/1976 | Norwich | 179/2 DP |
| 3,990,050 | 11/1976 | Kolettis et al. | 340/172.5 |
| 3,997,874 | 12/1976 | Kelly et al. | 340/172.5 |

*Primary Examiner*—Gareth D. Shaw
*Assistant Examiner*—C. T. Bartz
*Attorney, Agent, or Firm*—John P. Dority; William E. Cleaver; Marshall M. Truex

[57] ABSTRACT

Multiple dial adapter to provide interfacing between a communications multiplexer module (CMM), such as a computer system, and a plurality of automatic calling units connected to telephone lines. The adapter permits control of the automatic calling units via a single computer port and time shares common logic of the computer. The adapter also provides the capability of easily programmed pauses of any desired length in dialing sequences as required when dialing through remote telephone exchanges such as tie lines.

6 Claims, 6 Drawing Figures

MULTIPLE DIAL ADAPTER

BACKGROUND OF THE INVENTION

1. Field of the Invention

The present invention relates generally to improvements in a telephone dial adapter, and more particularly, pertains to a new and improved multiple dial adapter to interface between a CMM, such as a computer communications system, and any number of automatic calling units connected to telephone lines.

2. Description of the Prior Art

Those concerned with the development of telephone dial adapters have long recognized the need for a multiple dial adapter. The present invention fills this need.

Prior art dial adapters in the past have interfaced between a CMM and a single automatic calling unit connected to a telephone line. Such a device has been unsatisfactory in that the device failed to permit the use of two or more automatic calling units. Further, the devices by not permitting the use of two or more automatic calling units, failed to time share the common logic of the computer system of the CMM. Also, the devices would not provide easily generated pauses in the dialing sequences as required when dialing through remote telephone exchanges or tie lines.

SUMMARY OF THE INVENTION

The present invention obviates the foregoing disadvantages of the prior art dial adapters by providing a multiple dial adapter to interface between a CMM, such as a computer communications system, and a plurality of automatic calling units connected to an equal plurality of telephone lines to control the plurality of automatic calling units. The multiple dial adapter increases the capability of the CMM through accommodation of a plurality of automatic calling units from a single port of the CMM and time sharing of the common logic of the CMM in addition to providing hardware to generate dialing pause sequences and thereby reducing the software complexity of the module. The adapter may be easily constructed on a standard size printed circuit board from off-the-shelf integrated circuits and commercially available components for use with, for example, Bell Telephone and Telegraph 801A and 801C automatic calling units.

According to the preferred embodiment of the present invention, there is provided a multiple dial adapter to interface between a CMM and a plurality of automatic calling units connected to an equal plurality of telephone lines. The CMM is programmed to generate a coded command specifying which one of the units is to perform a telephone number dialing operation and then to successively generate coded commands specifying the telephone number the one unit is to dial.

The multiple dial adapter broadly includes a decoder means, a plurality of automatic calling unit interfaces, selector means and generator means. The decoder means receives the coded commands from the CMM and decodes the same to provide unit selecting and dialing instructions. Each of the plurality of interfaces is associated with one of the automatic calling units for presenting the status of its associated unit and for transferring dialing instructions thereto for performance of a telephone number dialing operation by the unit. The selector means is initially set in a cleared condition for receiving a unit selecting instruction from the decoder means and interrogating the status of a selected one of the units presented on the one of the interfaces associated with the selected unit. The selector means is capable of switching to an active condition in communication with the selected one of the units through its associated interface if the status of the selected unit is presented as being set for performance of a dialing operation. The generator means interprets the status of the selected unit as presented by its associated interface to the selector means and generates a code instructing the CMM as to the status of the selected unit in response to each coded command generated by the CMM.

More particularly, if upon interrogation by the selector means of the status of the selected automatic calling unit as presented by its associated interface, it was discovered that the selected unit's power was off or associated telephone line was busy or unavailable for some other reason, then the selector means would be unable to switch into communication with the unit and the generator means would interpret the unavailable status of the unit by generating an appropriate code to the CMM instructing it of the same. It is then up to the program in the CMM whether it will again try to initiate the dialing of the same number on the same unit or initiate a dialing operation on a different one of the units.

However, if upon interrogation by the selector means, the selected unit was found ready to perform the telephone number dialing operation, the selector means upon switching to its active condition will remain locked in such condition until the dialing operation is completed. As the dialing operation proceeds, the generator means instructs the CMM to generate each next successive coded command specifying a particular digit of the number to be dialed. The generator means interprets the status of the selected unit after each decoded telephone number digit instruction is received and processed by the selected unit. If the status of the unit is interpreted by the generator as a request to present the next digit, then it generates an appropriate code which will be understood by the CMM as an instruction to send the next digit. This interaction between the selected unit, the generator means and the CMM continues in a repetitive manner until the dialing operation is completed.

When the dialing operation has been successfully completed, the generator means so instructs the CMM and also generates a signal to the selector means which switches it back to a cleared condition in which it is again ready to select another automatic calling unit for performance of another dialing operation if instructed to do so by the program in the CMM.

Also, the CMM may be programmed to generate coded commands representing pauses to be inserted during a dialing operation, such as required when dialing through remote telephone exchanges such as "tie lines" and "outside lines." The generator means generates an appropriate code in response to a decoded pause instruction from the decoder means which instructs the CMM to delay for one second before the latter sends in the next telephone number digit.

DETAILED DESCRIPTION OF THE PREFERRED EMBODIMENT

Figure 1:
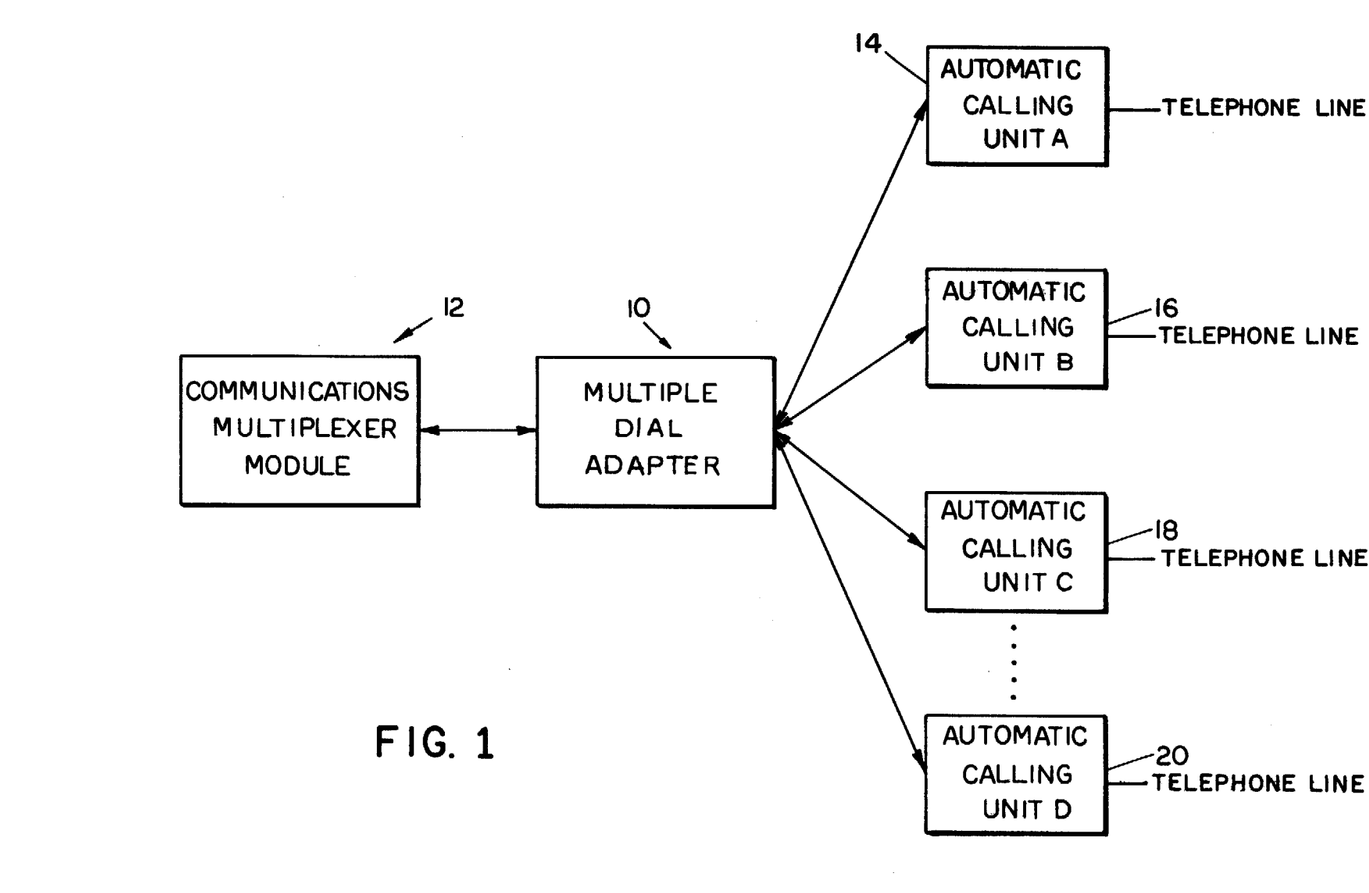
FIG. 1 illustrates a block diagram of the multiple dial adapter interfacing between the CMM and the plurality of automatic calling units.

Referring now to the drawings, and more particularly to FIG. 1, there is illustrated by means of a block diagram a multiple dial adapter 10 interfacing between a communications multiplexer module (CMM) 12 and a plurality of automatic calling units 14, 16, 18 and 20 also denoted as automatic calling units A, B, C and D, respectively, which are each connected to a telephone line. By way of example and for purposes of illustration only, the present invention should not be construed as being limited to a multiple dial adapter which is only capable of interfacing with four automatic calling units, but is to be construed and understood as being capable of interfacing with any number of automatic calling units. The CMM 12 may be of the type described in U.S. Pat. No. 4,012,718 which is assigned to the assignee of the present invention.

Figure 2:
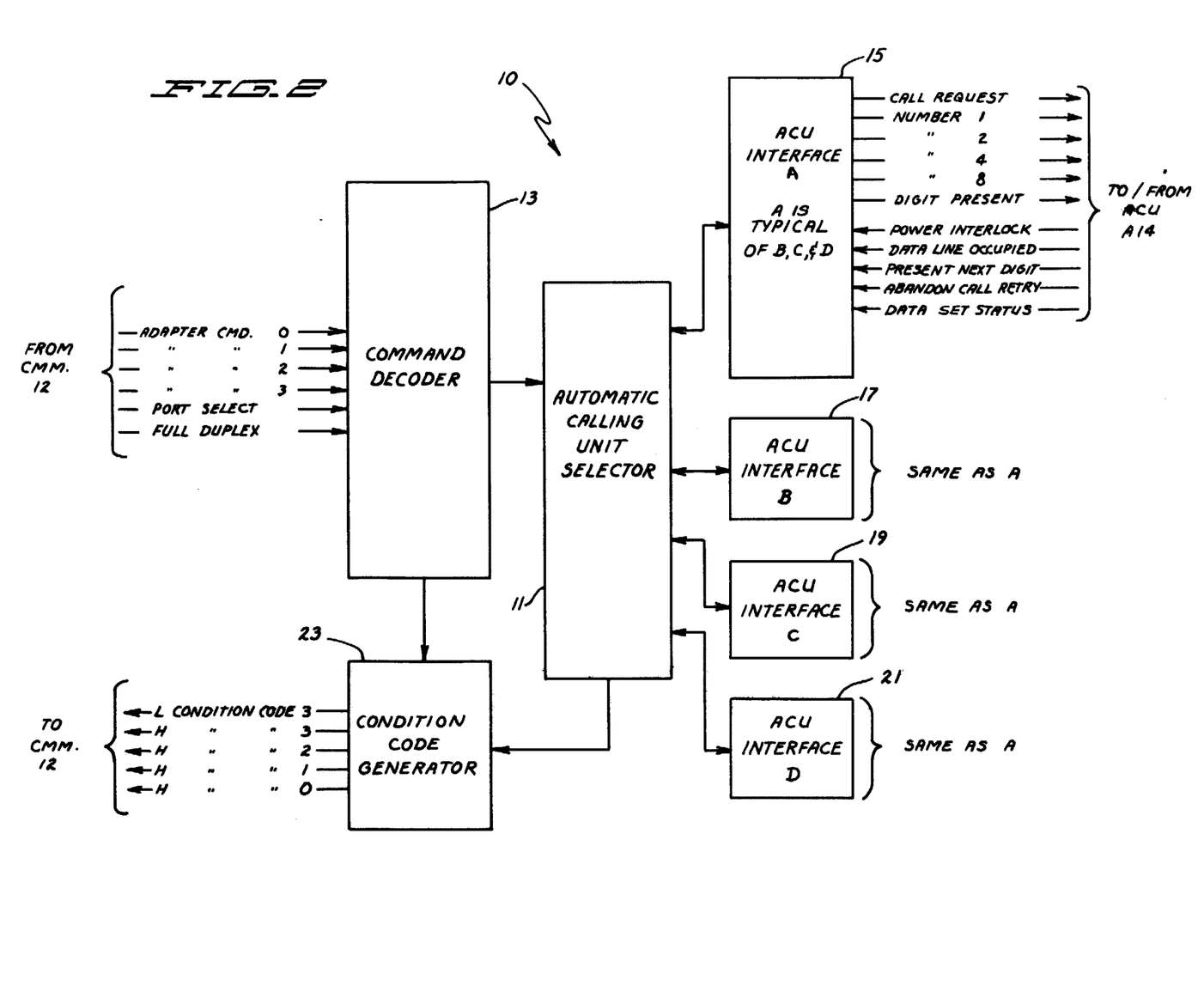
FIG. 2 is a block diagram of the basic parts of the multiple dial adapter comprising the present invention.

Turning now to FIG. 2, the multiple dial adapter 10 itself is illustrated in block diagram form. The adapter 10 basically includes the following sections: an automatic calling unit selector 11, a command decoder 13, automatic calling unit interfaces A, B, C and D (designated as 15, 17, 19 and 21 and in the preferred embodiment being four in number so as to correspond to the number of automatic calling units 14, 16, 18 and 20), and a condition code generator 23. At this point it would be helpful to briefly examine the manner in which the above-mentioned sections of the adapter 10 generally interact with one another, with the CMM 12 and the automatic calling units 14, 16, 18 and 20 in order to gain an overall understanding of how a dialing operation is performed utilizing the adapter 10, before the various parts thereof are described in detail.

The CMM 12 is programmed to initially generate a coded command specifying which one of the automatic calling units is to perform a telephone number dialing operation. A dialing operation can be performed with only one of the units 14, 16, 18 and 20 at a time. Then, the program will cause the CMM 12 to successively generate coded commands specifying the telephone number which the selected unit is to dial. The decoder section 13 receives the coded commands from the module 12 and decodes the same to provide unit selecting and dialing instructions. Each of the interface sections 15, 17, 19 and 21 presents the status of the one automatic calling unit it is associated with and also will transfer dialing instructions thereto for performance of a dialing operation by the unit. With the selector section 11 initially set in a cleared condition, it receives the unit selecting instruction from the decoder section 13 and interrogates the status of a selected one of the automatic calling units 14, 16, 18 and 20 being presented on its associated one of the interface sections 15, 17, 19 and 21. If the status of the selected unit, upon interrogation by the selector section 11, is found to be set for performance of the dialing operation, the selector section 11 switches to an active condition in communication with the selected one of the units 14, 16, 18 and 20 through its associated one of the interface sections 15, 17, 19 and 21. Each succeeding coded command generated by the CMM 12 specifying the telephone number to be dialed by the selected automatic calling unit and decoded into telephone number dialing instructions will then be transferred to the selected automatic calling unit through the selector section 11 and the one of the interfaces associated with the selected unit. The generator section 23 monitors the status of the selected automatic calling unit being presented by its associated interface to the selector section 11 and interprets the status for the CMM 12 by generating a condition code which instructs the CMM 12 as to the selected unit's status in response to each coded command generated by the CMM 12.

If upon interrogation by the selector section 11 of the status of the selected unit as presented by its associated interface section, it was discovered that the unit's power was off or associated telephone line was busy or unavailable for some other reason, then the selector section 11 would be unable to switch into communication with the unit and the generator section 23 would interpret the unavailable status of the unit by generating an appropriate code to the CMM 12 instructing it of the same. It is then up to the program in the CMM 12 whether it will again try to initiate the dialing of the same number on the same unit or initiate a dialing operation of a different one of the automatic calling units 14, 16, 18 and 20.

If upon interrogation by the selector section 11, the selected automatic calling unit was found ready to perform the telephone number dialing operation, the selector section 11 upon switching to its active condition will remain locked in such condition until the dialing operation is completed. As the dialing operation proceeds, the condition code generator section 23 instructs the CMM 12 to generate each next successive coded command specifying a particular digit to be dialed. The generator section 23 interprets the status of the selected unit after each decoded telephone number digit instruction is received and processed by the unit. If the status of the unit is interpreted by the generator section 23 as a request to present the next digit, then it generates an appropriate code which will be understood by the CMM 12 as an instruction to send the next digit. This interaction between the selected unit, generator section 23 and CMM 12 continues in a repetitive manner until the dialing operation is completed.

When the dialing operation has been successfully completed, the selector section 11 switches back to a cleared condition and is again ready to select another automatic calling unit for performance of another dialing operation if instructed to do so by the program in the CMM 12.

Also, the various signals which are transmitted to and from the CMM 12 and to and from the automatic calling units 14, 16, 18 and 20 are designated in FIG. 2. An explanation of these signals accompanies the detailed description of the parts of the multiple dial adapter 10 which now follows in reference to FIGS. 3–6.

FIGS. 3–6 illustrate the electrical circuit schematics which when taken together constitute the preferred embodiment of the multiple dial adapter 10 interfacing between the CMM 12 and the automatic calling units 14, 16, 18 and 20.

Figure 3:
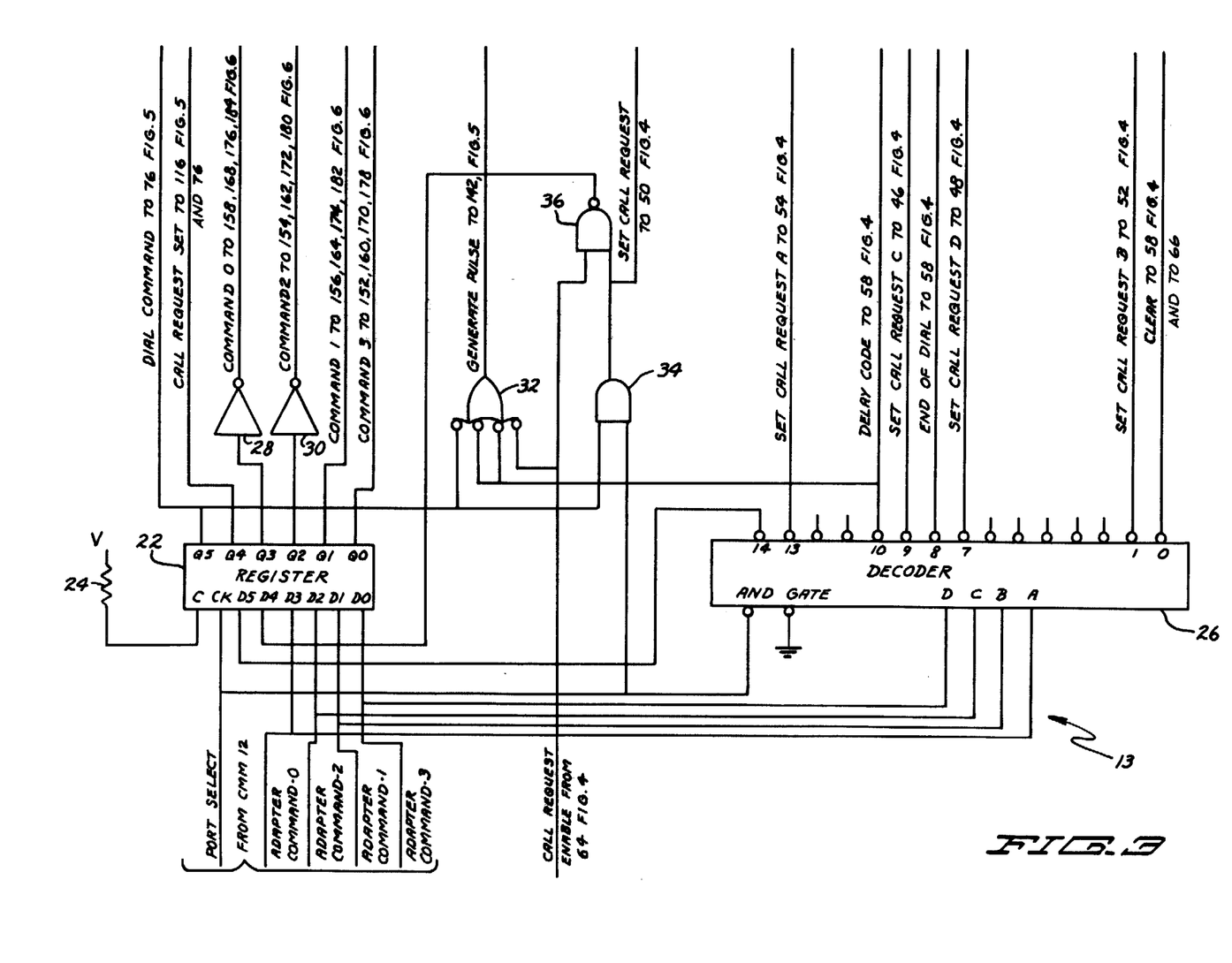
FIGS. 3–6 illustrate electrical circuit schematics which taken together constitute the preferred embodiment of the multiple dial adapter of the invention.

Turning first to FIG. 3, there is illustrated the command decoder section 13 of the adapter 10 which communicates with a single port of the CMM 12. The CMM 12 outputs a low Port Select signal and high Adapter Command Bit 0–3 signals connected to a clock input and data inputs D3, D1, D2 and D0 of a 6 bit register 22 respectively. Also, the output low Port Select Signal and high Adapter Command Bit 0–3 signals connect to one input of an internal AND gate and inputs A, B, C and D of 4-line to 16-line decoder 26 respectively. The other input of the internal AND gate of the decoder 26 connects to ground. The low Port Select signal also connects to one input of a NOR gate 34. A low Call Request Enable signal connects to one input of a NAND gate 32 and one input of a NAND gate 36. A resistor 24 connects between a voltage source V and a master reset input C of the 6 bit register 22.

The 6 bit register 22 outputs a low Dial Command signal, a high Call Request Set signal, a low Command $\phi$ signal through inverter 28, a low Command 2 signal through inverter 30, and high Command signals 1 and 3 respectively. The low Dial Command signal also connects to the other of the inputs of the NAND gate 32 and the NOR gate 34.

The 4-line to 16-line decoder 26 outputs a signal into the D5 input of the 6-bit register 22, a low Set Call Request A signal, a low Delay Code signal, a low Set Call Request C signal, a low End of Dial signal, a low Set Call Request D signal, and a low Set Call Request B signal, and low Clear signal. The low Delay Code signal also connects to two of the inputs of the NAND gate 32.

The NAND gate 32 outputs a high Generate Pulse signal. The NOR gate 34 outputs a high Set Call Request signal and also connects to the other input of the NAND gate 36 which connects to the D4 input of the 6-bit register 22.

Figure 4:
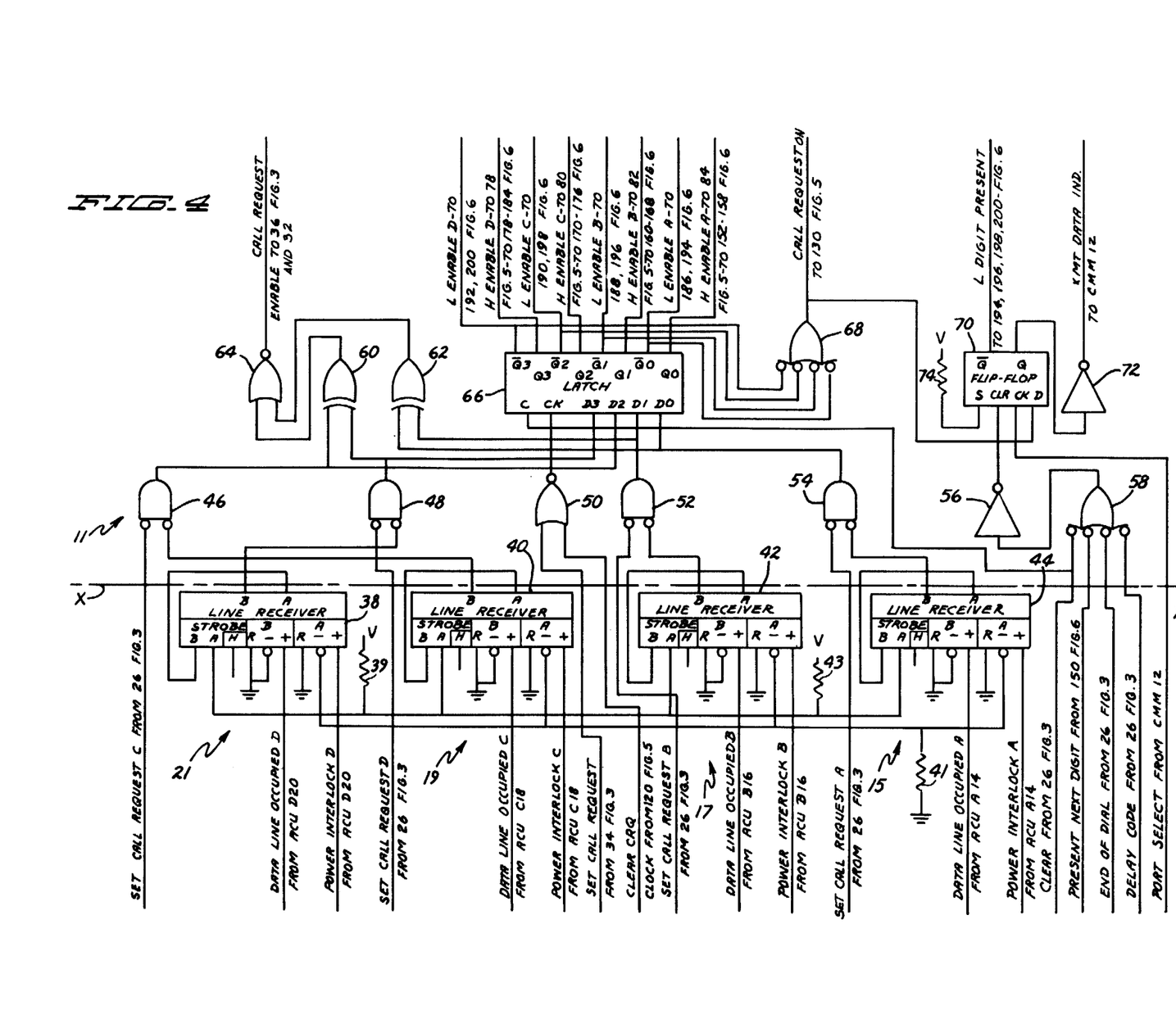

Next, FIG. 4, which is divided by broken line X—X, illustrates the automatic calling unit selector section 11 on the right side of line X—X and a portion of each of the automatic calling unit interface sections 15, 17, 19 and 21 on the left side of the line X—X.

The interface sections 21, 19, 17 and 15 respectively include line receivers 38, 40, 42 and 44 which have their B and A positive input terminals connected to high Data Line Occupied signals and high Power Interlock signals D, C, B and A from the automatic calling units 20, 18, 16 and 14 respectively. For each line receiver, the R input terminal connects to ground. The B minus input terminals of the line receivers connect directly to ground while the A minus input terminals connect to ground through resistor 41. The hystersis terminals H are not connected to anything. The A strobe input terminals connect to voltage source V through resistors 39 and 43. The A output of each line receiver is coupled back to its B strobe input.

The automatic calling unit selector section 11 includes NOR gates 46, 48, 50, 52 and 54, inverter 56, NAND gate 58, Exclusive OR gates 60, 62, NOR gate 64, 4-bit latch 66, NAND gate 68, a D-type flip-flop 70, inverter 72 and resistor 74. The B output of line receivers 38, 40, 42 and 44 of the interface sections 21, 19, 17 and 15 individually connect to one of the inputs of NOR gates 48, 46, 52 and 54 respectively. Low Set Call Request signals C, D, B and A from the 4-line to 16-line decoder 26 of FIG. 3 connect to the other input of the NOR gates 46, 48, 52 and 54 respectively. The outputs of the NOR gates 46 and 48 connect to the inputs of Exclusive OR gate 60 and inputs D2 and D3 of the 4-bit latch 66 respectively. The outputs of the NOR gates 52 and 54 connect to the inputs of Exclusive OR gate 62 and inputs D1 and D0 of the 4-bit latch 66 respectively. The outputs of Exclusive OR gates 60 and 62 connect to the inputs of NOR gate 64 which outputs a low Call Request Enable signal which connects to the one input of the NAND gate 32 and the one input of NAND gate 36 of FIG. 3.

The low Clear signal from the 4-line to 16-line decoder 26 of FIG. 3 connects to the master reset or clear terminal C of the 4-bit latch 66 and to one of the inputs of NAND gate 58. The high Set Call Request signal output of NOR gate 34 of FIG. 3 and the high Clear CRQ Clock signal from the output Q of a single-shot multivibrator 120 (which is part of the condition code generator section 23 to be described hereinafter in reference to FIG. 5) connect to the inputs of NOR gate 50 whose output connects to the clock input CK of the 4-bit latch 66.

The 4-bit latch 66 outputs low and high Enable signals A, B, C and D to the inputs of line drivers and digit drivers of the interface sections 15, 17, 19 and 21 to be described later in reference to FIG. 6. The low Enable A, B, C and D signals also connect to the inputs of NAND gate 68 which outputs a high Call Request On signal to logic in the condition code generator section 23 of FIG. 5. The output of the NAND gate 68 also connects to the D input of the D-type flip-flop 70. A resistor 74 is connected between the voltage source V and the set input S of the flip-flop 70. The low Port Select signal from the CMM 12 connects to the clock input CK of the flip-flop 70. The low Clear signal, the low End of Dial signal, and the low Delay Code signal from the 4-line to 16-line decoder 26 of FIG. 3 in addition to a high Present Next Digit signal from an Exclusive OR gate 150 of the interface sections of FIG. 6 connect to the inputs of the NAND gate 58 whose output connects to the input of the inverter 56. The output of the inverter 56 connects to the clear input CLR of the flip-flop 70. The complement output $\overline{Q}$ of the flip-flop 70 outputs a low Digit Present signal and the Q output connects to the input of the inverter 72 which outputs a high Transmit Data Indicator signal to the CMM 12.

Figure 5:
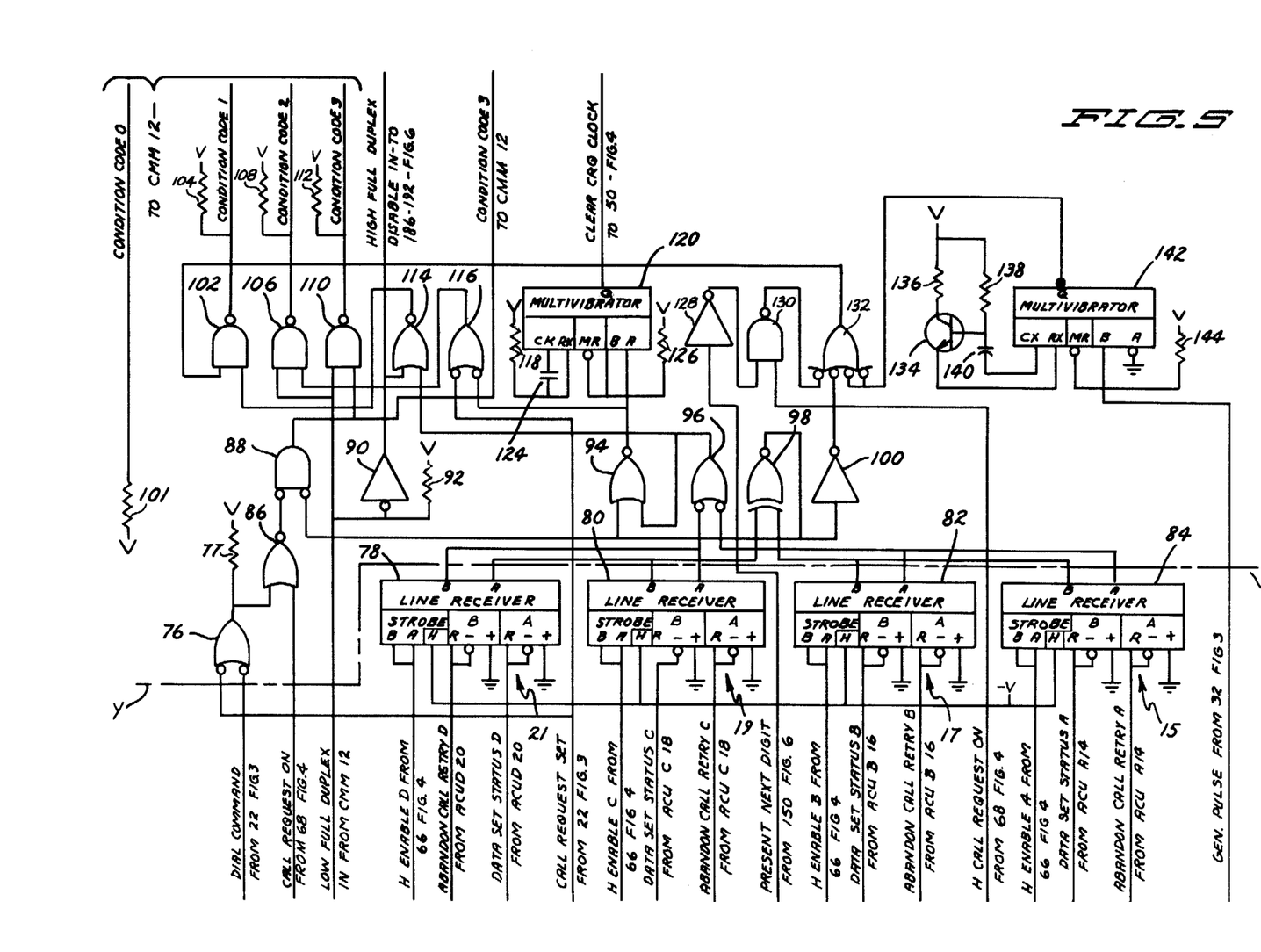

Continuing on, FIG. 5, which is divided by broken line Y—Y, illustrates the condition code generator section 23 on the right side of line Y—Y and another portion of each of the automatic calling unit interface sections 15, 17, 19 and 21 on the left side of the line Y—Y.

The interface sections 21, 19, 17 and 15 respectively include line receivers 78, 80, 82 and 84, each having the strobe inputs A and B which are connected to high Enable D, C, B and A signals from the 4-bit latch 66 of FIG. 4 respectively. The hystersis input H of each line receiver connects to the minus voltage source —V. For each line received, the B plus and A plus inputs connect to ground. The B minus and R inputs of the line receivers 78, 80, 82 and 84 connect to high Abandon Call Retry D signal, high Data Set Status C signal, high Data Set Status B signal, and high Data Set Status A signal from the automatic call units 20, 18, 16 and 14 respectively. The A minus and R inputs of the line receivers 78, 80, 82 and 84 connect to high Data Set Status D signal, high Abandon Call Retry C signal, high Abandon Call Retry B signal, and high Abandon Call Retry A signal from the automatic calling units 20, 18, 16 and 14.

The low Dial Command signal and high Call Request Set signal from the Q5, Q4 outputs of the 6-bit register 22 of FIG. 3 connect to the inputs of a NAND gate 76 whose output connects to an input of a NOR gate 86 and to voltage source V through a resistor 77. The high Call Request On signal from the output of the NAND gate 68 of FIG. 4 connects to the other input of the NOR gate 86 whose output connects to an input of a NOR gate 88. The other input of the NOR gate 88 connects to one input of a NOR gate 94, an output of an Exclusive OR gate 98, and an input of an inverter 100. The low Full Duplex Disable In signal from the CMM 12 connects to the input of an inverter 90, one input of a NAND gate 106, one input of a NAND gate 110, and to voltage source V through resistor 92. The inverter 90 outputs a high Full Duplex Disable In signal and connects to one input of a NOR gate 114. The B and A outputs of line receivers 78 and 80 respectively connect to one input of a NAND gate 96 while A outputs of line receiver 82 and 84 connect to the other input of the NAND gate 96. The A and B outputs of line receivers 78 and 80 also respectively connect to one input of an Exclusive OR gate 98 while the B outputs of line receivers 82 and 84 connect to the other input of the Exclusive OR gate 98. The output of the NAND gate 96 connects to the other input of the NOR gate 94 and to the other input of the NOR gate 114. The output of the Exclusive OR gate 98 connects to the input of the inverter 100, the one input of the NOR gate 94, and the other input of NOR gate 88. The output of inverter 100 connects to one input of a NAND gate 132.

A high Generate Pulse from the output of the NAND gate 32 of FIG. 3 connects to the B set input of a single-shot multivibrator 142. The A set input connects to ground. The master reset input MR of the multivibrator 142 connects to the voltage source V through resistor 144. A timing circuit consisting of NPN transistor 134, resistors 136 and 138 which connect to the collector and base respectively of the transistor 134, and a capacitor 140 connect from the junction of the base of the transistor 134 and resistor 138 to the clock input CX of the multivibrator 142. The RX input of the multivibrator 142 connects to emitter of the transistor 134. The junction of the resistors 136 and 138 connect to the voltage source V. The $\overline{Q}$ output of the single-shot multivibrator 142 connects to two of the inputs of the NAND gate 132.

Figure 6:
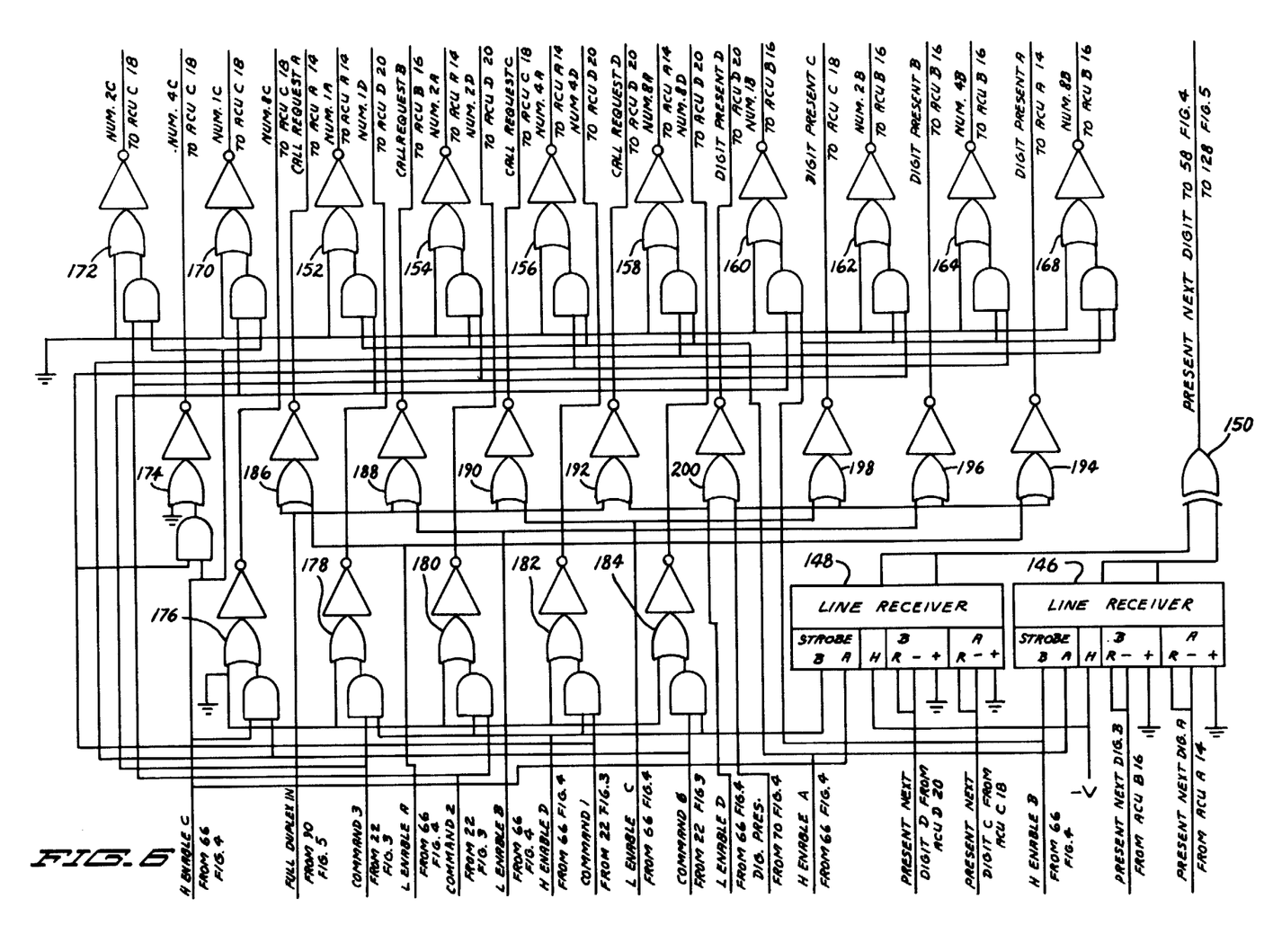

A high Present Next Digit signal from the output of the Exclusive OR gate 150 of FIG. 6 connects to the input of an inverter 128 whose output connects to one input of a NAND gate 130. A high Call Request On signal from the output of the NAND gate 68 of FIG. 4 connects to the other input of the NAND gate 130 whose output connects to one of the other inputs of the NAND gate 132. The output of the NAND gate 132 connects to one input of the NAND gate 102. The output of the NOR gate 114 connects to the other input of the NAND gate 102 to output a high Adapter Condition Code 1 signal. A resistor 104 connects between the output of the NAND gate 102 and the voltage source V. A resistor 101 connects to voltage source V to output a high Condition Code 0 signal. A high Call Request Set signal from the Q4 output of the 6-bit register 22 of FIG. 3 and the output of the NOR gate 94 connect to the inputs of a NAND gate 116 whose output connects to the other input of the NAND gate 106. The low Full Duplex Disable In signal from the CMM 12 connects to the one input of the NAND gate 106 to output a high Adapter Condition Code 2 signal. A resistor 108 connects between the output of the NAND gate 106 and the voltage source V. The output of AND gate 88 produces a high Adapter Condition Code 3 signal when properly enabled and also connects to the other input of the NAND gate 110 which outputs a low Adapter Condition Code 3 signal. The Adapter Condition Codes connect to the CMM 12. The output of the NOR gate 94 also connects to the A set input of the single-shot multivibrator 120. A resistor 126 connects the B set input and master reset MR input terminals to the voltage source V. A capacitor 124 and resistor 118 respectively serially connect between the CX input and the voltage source V. The RX input terminal connects to the junction of resistor 118 and capacitor 124. Single-shot multivibrator 120 outputs a high Clear CRQ Clock signal to one input of the NOR gate 50 of FIG. 4.

Finally, FIG. 6 illustrates the remaining portion of each of the automatic calling unit interface sections 15, 17, 19 and 21.

A line receiver 146 forms part of both interface sections 15 and 17, while a line receiver 148 forms part of both interface sections 19 and 21. Line receiver 146 has its A minus and R inputs coupled together and its B minus and R inputs coupled together so as to respectively receive the high Present Next Digit A and the high Present Next Digit B from the automatic calling units 14 and 16. Line receiver 148 has its A minus and R inputs coupled together and its B minus and R inputs coupled together so as to respectively receive the high Present Next Digit C and the high Present Next Digit D from the automatic calling units 18 and 20. The positive inputs of the line receivers 146 and 148 connect to ground. The hystersis inputs H thereof connect to the minus voltage source V. The high Enable A and B signals from the Q0, Q1 outputs of the 4-bit latch 66 of FIG. 4 connect to the respective A and B strobe inputs of the line receiver 146. The high Enable C and D signals from the Q2, Q3 outputs of the 4-bit latch 66 of FIG. 4 connect to the respective A and B strobe inputs of the line receiver 148. The outputs of the line receiver 146 connect to one input of the Exclusive OR gate 150 and the outputs of the line receiver 148 connect to the other input of the Exclusive OR gate 150 which outputs a high Present Next Digit signal to the inputs of NAND gate 58 of FIG. 4 and inverter 128 of FIG. 5, as described earlier.

The automatic calling unit interface sections 15, 17, 19 and 21 also include logic gates 152-184 which are digit drivers having the output line of an AND gate and an inhibit line connected to an OR gate followed by an inverter, and logic gates 186-200 which are line drivers having an OR gate followed by an inverter. Specifically, interface section 15 includes digit drivers 152, 154, 156 and 158 and line drivers 186 and 194. Interface section 17 includes digit drivers 160, 162, 164 and 168 and line drivers 188 and 196. Interface section 19 includes digit drivers 170, 172, 174 and 176 and line drivers 190 and 198. Interface section 21 includes digit drivers 178, 180, 182 and 184 and line drivers 192 and 200.

The inhibit line of the OR gates of the digit drivers 152-184 connects to ground. The high Enable A signal from the Q0 output of the 4-bit latch 66 of FIG. 4 connects to one input of the AND gates of the digit drivers 152-158 of the interface section 15. A high Command 3 signal from the Q0 output of the 6-bit register 22 of FIG. 3, low Command 2 signal from the output of inverter 30 of FIG. 3, high Command 1 signal from the Q1 output of the 6-bit register 22 of FIG. 3, and low Command 0 signal from the output of inverter 28 of FIG. 3 connect to the other input of the AND gates of the digit drivers 152-158, outputting high Number 1, 2, 4 and 8 A signals, respectively, through the inverters of the digit drivers to the automatic calling unit 14. The high Enable B signal from the Q1 output of the 4-bit latch 66 of FIG. 4 connects to one input of the AND gates of the digit drivers 160-168 of the interface section 17. The just-mentioned high Command 3 signal, low Command 2 signal, high Command 1 signal, and low Command 0 signal connect to the other input of the AND gates of the digit drivers 160–168, outputting high Number 1, 2, 4 and 8 B signals, respectively, through the inverters of the digit drivers to the automatic calling unit 16. The high Enable C signal from the Q2 output of the 4-bit latch 66 of FIG. 4 connects to one input of the AND gates of the digit drivers 170–176 of the interface section 19. The previously-mentioned high Command 3 signal, low Command 2 signal, high Command 1 signal, and low Command 0 signal connect to the other input of the AND gates of the digit drivers 170–176, outputting high Numbers 1, 2, 4 and 8 C signals, respectively, through the inverters of the digit drivers to the automatic calling unit 18. The high Enable D signal from the Q3 output of the 4-bit latch 66 of FIG. 4 connects to one input of the AND gates of the digit drivers 178–184 of the interface section 21. The above referred to high Command 3 signal, low Command 2 signal, high Command 1 signal, and low Command 0 signal connect to the other input of the AND gates of the digit drivers 178–184, outputting high Numbers 1, 2, 4 and 8 D signals, respectively, through the inverters of the digit drivers to the automatic calling unit 20.

A high Full Duplex Disable In signal from the output of the inverter 90 of FIG. 5 connects to one input of the OR gates of the line drivers 186, 188, 190 and 192 of respective interface sections 15, 17, 19 and 21. A low Enable A signal, low Enable B signal, low Enable C signal, and low Enable D signal respectively from the $\overline{Q0}$, $\overline{Q1}$, $\overline{Q2}$ and $\overline{Q3}$ outputs of the 4-bit latch 66 of FIG. 4 connect, respectively, to the other input of the OR gates of the line drivers 186–192 which produce at their respective outputs high Call Request A, B, C and D signals after passing through the inverters of the line drivers 186–192. Such output signals from the line drivers 186–192 are respectively connected to automatic calling units 14, 16, 18 and 20.

A low Digit Present signal from the output of flip-flop 70 of FIG. 4 connects to one input of the OR gates of the line drivers 194, 196, 198 and 200 of respective interface sections 15, 17, 19 and 21. The above-mentioned low Enable A signal, low Enable B signal, low Enable C signal, and low Enable D signal connect to the other input of the OR gates of the line drivers 194–200 causing high Digit Present A, B, C and D signals respectively at the output terminals of the inverters of the line drivers 194–200. Such output signals from the line drivers 194–200 are respectively connected to automatic calling units 14, 16, 18 and 20.

PREFERRED MODE OF OPERATION

Referring to FIG. 1, the Multiple Dial Adapter 10 performs a dialing operation with only one of the automatic calling units 14, 16, 18 and 20 at a time. At any given time, the one unit on which a dialing operation is to be performed depends entirely on the program within the CMM 12. The sixteen possible combinations of the four Adapter Command Bits 3–0 from the CMM 12 are decoded by the command decoder section 13 of the multiple dial adapter 10 as follows:

| Adapter Command Bits 3, 2, 1 and 0 | | Decoded Adapter Response |
|---|---|---|
| | 0101 | Dial Digit 0 |
| (1) | 1101 | Dial Digit 1 (Select automatic calling unit A) |
| (1) | 0001 | Dial Digit 2 (Select automatic calling unit B) |
| (1) | 1001 | Dial Digit 3 (Select automatic calling unit C) |
| (1) | 0111 | Dial digit 4 (Select automatic calling unit D) |
| | 1111 | Dial Digit 5 |
| | 0011 | Dial Digit 6 |
| | 1011 | Dial Digit 7 |
| | 0100 | Dial Digit 8 |
| | 1100 | Dial Digit 9 |
| (2) | 0000 | Illegal (Clear dialer command code) |
| | 1000 | End-of-dial code |
| | 0110 | End-of-number code |
| (2) | 1110 | Illegal (Set call request command code) |
| (2) | 0010 | Illegal (Not decoded) |
| (3) | 1010 | Delay code |

(1) Each of these codes will be decoded as an automatic calling unit selecting instruction if it is the first command code received by the decoder section 13 of the adapter 10 after code 1110 or as a dial digit instruction if it appears thereafter.
(2) These codes should never be presented to the adapter 10 during the dialing of a number.
(3) Code 1010 will cause the dialing sequence to be delayed. No digit will be presented to the automatic calling unit when this code is presented to the adapter. The next code will not be requested for 1.0 ± 0.6 seconds. Several 1010 codes may be used sequentially by the CMM to obtain required delay in the dialing sequence. This may be useful when dialing through remote telephone exchanges in "tie line" type operations.

When the multiple dial adapter 10 is in the cleared or inactive state, all Call Request signals from the line drivers 186, 188, 190 and 192 to the respective units 14, 16, 18 and 20 are in the low (off) state, all digit signals, Number 1, 2, 4 and 8 from the digit drivers 152–184 to the respective units 14, 16, 18 and 20 are in the high (on) state and all Digit Present signals from the line drivers 194, 196, 198 and 200 to the respective units 14, 16, 18 and 20 are in the off state. The Abandon Call Retry and Data Set Status receivers 78, 80, 82 and 84 are disabled because the Enable signals from the decoder section 13 are low.

To perform a dialing operation, the program in the CMM 12 must generate a Port Select pulse and a command code of 1110. The Port Select pulse and the command code 1110 is received by the decoder 26 of the multiple dial adapter 10, decoded and sent from output No. 14 of the decoder 26 to the D5 input of the 6-bit register 22 which causes the latter to generate a low Dial Command signal from its Q5 output. The low Dial Command signal from the 6-bit register 22 Q5 output is applied through the NAND gate 76, the NOR gate 86 and the NOR gate 88 of condition code generator section 23 to force high Adapter Condition Code 3 and through the NAND gate 110 to force low Adapter Condition Code 3 to their active states (i.e., low Adapter Condition Code 3 is low and high Adapter Condition Code 3 is high). The Adapter Condition Codes are sent to the CMM 12 by the generator section 23 to instruct the CMM 12 as to the current state of the multiple dial adapter 10. The low Dial Command signal from the Q5 output of the 6-bit register 22 is also applied through the NAND gate 32 to trigger the single-shot multivibrator 142 to produce a pulse on high Adapter Condition Code 1 via NAND gate 102. The trailing edge of this pulse is interpreted as a clock pulse by the CMM 12 and it, in turn, generates another Port Select pulse.

This Port Select pulse strobes a new command code into the decoder 26. This command code must be 1101, Set Call Request A; 0001, Set Call Request B; 1001, Set Call Request C; or 0111, Set Call Request D. For this example, assume that it is Set Call Request A, 1101, which produces a low at output No. 13 of the decoder 26. This signal is applied to one input of the NOR gate 54. The other input to the NOR gate 54 is from the B output of the line receiver 44. This line receiver 44 monitors the Power Interlock A and Data Line Occupied A signals from the associated automatic calling unit A, 14. If these signals indicate that the automatic calling unit 14 is in a condition to perform a dialing operation, i.e., power is on and the telephone line is not busy, a low signal from the B output of the line receiver 44 is applied to the NOR gate 54. The output of the NOR gate 54 applies a high to the D0 input of the 4-bit latch 66. A Clock pulse to load data into the 4-bit latch 66 is generated by low Dial Command signal and the Port Select pulse applied to the NOR gate 34. The output of the NOR gate 34 is applied through the NOR gate 50 to the clock input of the 4-bit latch 66 which sets its Q0 flip-flop at the trailing edge of the Port Select signal. This activates Call Request A to automatic calling unit A, 14, via the line driver 186 and enables the Digit Present A of the line driver 194 and the digit drivers 152, 154, 156 and 158.

The high output of the NOR gate 54, together with low outputs from the NOR gates 46, 48 and 52 are applied to the Exclusive OR gates 60 and 62 which produce a low Call Request Enable signal from the NOR gate 64. This low signal is applied through the NAND gate 32 to trigger the single-shot multivibrator 142 and produce another Clock pulse. The low Dial Command signal that has been holding Adapter Condition Code 3 active will be removed at the trailing edge of the Port Select pulse but the low Enable A signal to the NAND gate 68 keeps Adapter Condition Code 3 signals active via the OR gate 86 and the NOR gate 88. This causes one more Port Select pulse to be generated which strobes the first digit to be dialed into the 6-bit register 22.

If the Power Interlock A Signal had been off or the Data Line Occupied A signal had been on when the attempt was made to activate the Q0 flip-flop of latch 66, the B output from the line receiver 44 would be high and, thus, the Q0 flip-flop of 4-bit latch 66 would not be set and, consequently, the A section of the adapter 10 would not be enabled. All four inputs to the Exclusive OR gates 60 and 62 would be low which would inhibit the low Call Request Enable signal from NOR gate 64 at the input of the NAND gate 32 which would not trigger the single-shot multivibrator 142. The high Call Request Enable signal would also cause a low signal to be latched into the Q4 output of the 6-bit register 22, via the NAND gate 36. This low Call Request Set signal via the NAND gate 76, the NOR gate 86, and the NOR gate 88 keeps the adapter condition code 3 signals in their active state. The low Call Request Set signal also is applied through the NAND gate 116 and the NAND gate 106 to cause the high Adapter Condition Code 2 to go low. Since the single-shot multivibrator 142 was not triggered, high Adapter Condition Code 1 is also in the high state. The combination of high Condition Code 3, low Condition Code 2, and high Condition Code 1 is interpreted as a status code that indicates that the Set Call Request command could not be executed and the dialing sequence has halted.

If the Enable A flip-flop Q0 of 4-bit latch 66 is set, the Call Request A signal is sent to the automatic calling unit A, 14, which responds by turning on interface signals Data Line Occupied A and Present Next Digit A. The associated line receivers are enabled so that these signals will be recognized. When Present Next Digit A from automatic calling unit A is turned on, it produces a low output at the A output of the line receiver 146 which produces a high Present Next Digit signal at the output of the Exclusive OR gate 150. This removes the low Present Next Digit signal from the input to the inverter 56 which had been holding the D-type flip-flop 70 in the reset condition. With a high Call Request On signal applied to its D input and the low Clear signal removed, the flip-flop 70 will be set at the trailing edge of the Port Select pulse which will occur soon after the trailing edge of the 1.0±0.6 second one-shot pulse from multivibrator 142. This requires that the automatic calling unit A, 14, respond with the Present Next Digit signal within one second after Call Request A signal was sent to the automatic calling unit A, 14. The Port Select pulse that set the flip-flop 70 to generate Digit Present A, via the line driver 194, also strobed the dial digit command code into the 6-bit register 22. The Q0, Q1, Q2 and Q3 outputs are used to generate number 1A, number 2A, number 4A and number 8A signals to automatic calling unit A, 14, via the inverters and the line drivers. These digit signals and the digit present signal are held constant while the automatic calling unit A, 14, converts the signals to dialing pulses or tones on the telephone lines.

When the automatic calling unit A, 14, has completed processing the first digit, it turns Present Next Digit A off. This produces a high at the A output of the line receiver 146 which results in a low Present Next Digit signal at an input to the NAND gate 58 and resets the flip-flop 70, which turns off Digit Present A. The low Present Next Digit signal is inverted and applied via the NAND gate 103 and the NAND gate 132 to the NAND gate 102 to produce a low Adapter Condition Code 1 signal. After a brief pause, the automatic calling unit A, 14, will again turn on the Present Next Digit signal which causes Adapter Condition Code 1 to go high. This transition is interpreted as a clock pulse by the CMM 12 and another Port Select pulse is generated which strobes the next dial digit command code into the 6-bit register 22. The Digit Present A interface lead is turned on again via the flip-flop 70 as described above. This sequence is repeated as each digit of the telephone number is presented to the automatic calling unit A, 14.

The multiple dial adapter 10 has the capability of inserting a pause in the dialing sequence as is often required when dialing through various telephone exchanges. This is accomplished by inserting one or more Delay Code signals in the sequence of dial digits. When a Delay Code signal 1010 is strobed into the 4-line to 16-line decoder 26 by a Port Select pulse, the No. 10 output of the decoder 26 goes low. This Delay Code signal is applied through the NAND gate 58 to hold the flip-flop 70 reset and not generate the Digit Present A signal to the automatic calling unit A, 14. The Delay Code signal is also applied via the NAND gate 32 to trigger the single-shot multivibrator 142 and force Adapter Condition Code 1 low for 1.0±0.6 seconds. At the expiration of the one-shot pulse, the CMM 12 generates another Port Select pulse and strobes the next dial digit command code into multiple dial adapter 10. The effect of the delay digit is to cause the automatic calling unit to ignore the signals on the digit lines, Number 1, Number 2, Number 4 and Number 8, by keeping the Digit Present interface lead in the off condition and requesting the next digit from the CMM 12 after a delay of one second. If longer delays are required, any number of Delay Code signals in any sequence can be used by the CMM 12 in the telephone number to be dialed.

When the complete telephone number has been presented to the automatic calling unit A, 14, as described above, the final command code to be strobed into the adapter 10 should be an End-of-Dial code (or it may be an End-of-Number code followed by the End-of-Dial code). The End-of-Dial code produces a low signal on the No. 8 output of the 4-line to 16-line decoder 26. The low End-of-Dial signal is applied through the NAND gate 58 to hold the flip-flop 70 reset and thus inhibit Digit Present A signal to the automatic calling unit A, 14. The effect of this code is to halt any further processing of dial digits by the adapter 10. The Call Request signal to the automatic calling unit is on, the Present Next Digit signal from the automatic calling unit is on, but the Digit Present interface lead is off. The automatic calling unit stops dialing and no clock pulses are generated to request additional digits from the CMM 12. The adapter 10 remains in this state until signals are received from the automatic calling unit indicating the results of the preceding dial operation.

If the dialing operation has resulted in a connection between the calling and called terminals, the automatic calling unit will turn the Data Set Status lead on. This will cause the B output of the line receiver 84 to go low and the output of the Exclusive OR gate 98 to go high. This high is applied to the NAND gate 88 which forces the Adapter Condition Code 3 signals to their inactive status (i.e., low Adapter Condition Code 3 is high and high Adapter Condition Code 3 is low). The high output of the Exclusive OR gate 98 is inverted and applied through the NAND gate 132 to force Adapter Condition Code 1 to a low output. The CMM 12 interprets the combination of Condition Code 3 low, Condition Code 2 low, and Condition Code 0 high generated by the condition code generator section 23 of the adapter 10 as an indication that the dialing operation has been successfully completed. The high signal from the Exclusive OR gate 98 is also applied through the NOR gate 94 to trigger the single-shot multivibrator 120 of the generator section 23. The 50±20 milliseconds pulse from the single-shot multivibrator 120 is applied through the NOR gate 50 to clear the 4-bit latch 66, and thereby turn the Call Request A signal off and return the adapter 10 to its cleared condition.

If the dialing sequence does not result in a telephone connection between the calling and the called terminals due to a line busy, called terminal not ready, wrong number, or any other reason, the automatic calling unit will generate an Abandon Call Retry signal when its internal timer expires. This produces a low signal at the A output of the line receiver 84 and a high at the output of the NOR gate 94. This high signal is applied through the NOR gate 114 and the NAND gate 102 to force Adapter Condition Code 1 to a high state. It is also applied through the NOR gate 94, the NAND gate 116, and the NAND gate 106 to force Adapter Condition Code 2 low. The combination of Condition Code 3 high, Condition Code 2 low, and Condition Code 0 high is interpreted by the CMM 12 as an Abandon Call Retry instruction from the generator section 23. The output of the NOR gate 94 also triggers single-shot multivibrator 120 which puts the adapter (4-bit latch 66) in its cleared condition after 50±20 milliseconds.

The procedures described above for the automatic calling unit A, 14, interface circuitry are applicable for the B, C or D automatic calling units 16, 18 and 20 respectively. Which selection is energized is determined by the first command code strobed into the adapter after the dial command code. This determines which flip-flop in the 4-bit latch 66 is set and which section of the adapter and automatic calling unit is enabled. It is not possible to enable more than one automatic calling unit at a time.

Various modifications can be made to the multiple dial adapter of the present invention without departing from the apparent scope thereof. The described invention can be expanded to control any number of automatic calling units in excess of the four disclosed by appropriate interface drivers, line receivers and call request flip-flop logic circuitry. As disclosed, the four adapter command bits which are used by the communications multiplexer module would permit as many as twelve automatic calling units to be controlled.

Having thus described the invention, what is claimed is:

1. A multiple dial adapter to interface between a communications multiplexer module and a plurality of automatic calling units connected to an equal plurality of telephone lines, said module being programmed to generate a coded command specifying which one of said units is to perform a telephone number dialing operation and then to successively generate a coded command specifying the telephone number said unit is to dial, said adapter comprising:

decoder means connected to said module for receiving said coded commands from said module and decoding the same to provide unit selecting and dialing instructions;

a plurality of interfaces, each connected with one of said units for receiving and presenting the status of said unit and for transferring dialing instructions thereto for performance of a telephone number dialing operation by said unit;

selector means connected to said decoder means and to each of said interfaces, said selector means being initially set in a cleared condition for receiving a unit selecting instruction from said decoder means and interrogating the status of a selected one of said units presented on said one of said interfaces connected to said selected one unit, said selector means capable of switching to an active condition in communication with said selected one of said units through its associated interface if the status of said selected unit is presented as being set for performance of a dialing operation; and generator means connected to said selector means and to said module for receiving from said selector means the status of said selected unit as presented by its associated interface to said selector means, interpreting said received status, and generating a code to said module for instructing said module as to said status of said selected unit in response to each coded command generated by said module to said decoder, said selector means when switched to said active condition being capable of successively receiving from said decoder means said dialing instructions corresponding to consecutive digits of the telephone number to be dialed and of transferring the same to said selected unit through its associated interface for performance of the dialing operation on said transferred instructions, said selector means further capable of interrogating the status of said selected unit presented by its associated interface to said selector means after the performance of the dialing operation on each transferred instruction;

said generator means receiving from said selector means the status of said selected unit after the performance of the dialing operation on each transferred instruction and, if the status is interpreted by said generator means as a request to present the next digit, said generator means then generates a code to said module instructing the same to send the coded command representing the next digit of the telephone number to said decoder means.

2. The multiple dial adapter as recited in claim 1, wherein said generator means also generates a signal to said selector means for switching said selector means back to its cleared condition upon completion of said dialing operation by said selected unit.

3. The multiple dial adapter as recited in claim 1, wherein at least one of said coded commands from said module to said decoder means is decoded by said decoder means as an instruction to cause a pause in said dialing operation being performed by said selected unit, said generator means is then operable after a predetermined interval of time has passed to generate a code instructing said module to generate another telephone number coded command.

4. The multiple dial adapter as recited in claim 1, wherein said selector means is incapable of switching to said active condition if the status of said selected unit is presented by its associated interface to said selector means as being unavailable for performance of a dialing operation.

5. The multiple dial adapter as recited in claim 1 wherein said plurality of interfaces comprises an equal plurality of line receivers.

6. The multiple dial adapter as recited in claim 1 wherein said selector means comprises a latch means.

* * * * *